Patented Jan. 4, 1949

2,458,373

UNITED STATES PATENT OFFICE 2,458,373

PROCESS FOR PREPARING NITRILES OF DICARBOXYLIC ACIDS

Hugh J. Hagemeyer, Jr., Kingsport, Tenn., assignor to Eastman Kodak Company, Rochester, N. Y., a corporation of New Jersey No Drawing. Application August 10, 1945, Serial No. 610,197

2 Claims. (Cl. 260—465.2)

This invention relates to a continuous process for the preparation of the nitriles of organic carboxylic acids. The invention relates more specifically to an improved process for the preparation of nitriles of organic carboxylic acids by dehydrating amides or ammonium salts of carboxylic acids by means of an anhydride of a lower aliphatic acid at 350–550° C.

Previous processes have been disclosed of making nitriles by contacting acid amides with acid anhydrides. Rice, J. A. C. S. 56, 1760 (1934) first disclosed the reaction of an acid anhydride and an acid amide to form the nitrile. This reaction was extended to include aliphatic dicarboxylic acids by Rigby, U. S. 2,121,551, and Dreyfus, U. S. 2,288,687.

In all of these processes treatment for considerable time is necessary to obtain the nitrile from the amide. This long period of treatment is conducive to the occurrence of secondary reactions, and it has been recognized in the prior art that decomposition products are formed by long periods of heating at elevated temperatures.

One object of my invention is to provide a process for preparing nitriles of organic carboxylic acids from the amides or ammonium salts of those acids which is substantially instantaneous. Another object of my invention is to provide a method of preparing nitriles of carboxylic acids which operates continuously. A further object of my invention is to provide a process for making nitriles of carboxylic acids giving high yields even with reactants which have been subject to decomposition and/or secondary reactions in previous processes. Yet another object of my invention is to provide a high temperature and substantially vapor phase process for preparing nitriles of carboxylic acids from non volatile amides and ammonium salts. A still further object of this invention is to provide operating conditions for conducting this reaction. Other objects will appear herein.

In its broadest aspects my invention comprises a process in which a current of the vapors of a lower aliphatic acid anhydride either monomeric or dimeric, is continuously passed into a heated zone at 350–550° C., preferably 350–450° C., to which is continuously supplied the amide or ammonium salt of an organic carboxylic acid whereby substantially instantaneous dehydration of the amide or ammonium salt occurs and the resulting products, mainly nitrile and organic acid, are continuously withdrawn from this zone. Dissolving first in a nitrile is highly desirable in those cases where the compound to be dehydrated is an ammonium salt since the solvent or carrier must not be stripped out prematurely in order to avoid decomposition of the ammonium salt and/or excessive coking in the reaction chamber of the ammonium salt or decomposition products thereof. The nitrile is separated from the organic acid and any other compounds present such as by distillation.

A very satisfactory embodiment of my process is a vertical heated tube, empty or preferably packed with any suitable inert packing material such as glass rings, pyrex chips, carbon rods, Berl saddles, Raschig rings, spiral rings, silica gel, or any other type of packing, particularly one which assists good contact of the vapors taking part in the reaction and increases the heating surface, which tube is also provided with a means for keeping the same at substantially constant temperature.

My process is of particular interest for the preparation of the dinitriles of the aliphatic dicarboxylic acids such as adipic, sebacic, suberic, fumaric and glutaric acids. However, it is useful in preparing the nitriles of other carboxylic acids such as aromatic acids, for example, benzoic acid or monocarboxylic aliphatic acids such as lauric, palmitic, oleic and stearic acids.

In the carrying out of my process, it is desirable to dissolve the amide or ammonium salts to facilitate their being fed into the reaction tube and also to better disperse them therein after their introduction. The preferred liquids for this purpose are the nitriles, particularly those corresponding to the nitriles which are being prepared. The lower aliphatic anhydrides may be employed along with the nitriles as solvents for the amide or ammonium salt to be introduced into the reaction. This may be used, if desired, as a method of introducing anhydride vapors into the reaction zone, the temperature within the preheater immediately vaporizing the anhydride upon its introduction.

In the operation of my process the rate at which the reactants are fed to the tube in which the reaction is carried out will be governed by the temperature employed, the effectiveness of the heating means, the dimensions of the tube and the particular amide or ammonium salt to be dehydrated. To assist in maintaining the desired temperature and increase the rate of feed, it is desirable that the solutions of the amides or ammonium salts be preheated before introducing them into the reaction zone, thus requiring less heat units to attain the desired temperature in the tube.

The contact time of the reactants while in the heated tube should be short as the nitrile formed should be removed from the tube as rapidly as possible. I have found that a contact time of 4-6 seconds is desirable although shorter or longer times can be employed with more repassing (if shorter) or if nitrile quality is not of importance (if longer). As more dehydration is necessary of ammonium salts than of the amides, it is preferred in the case of the former (which may also be done with the amides) to repass once or several times, after removal of nitrile, thus avoiding excessive times of contact of the nitrile with the heated tube.

The temperature employed in the tube is within the range of 350-550° C. As the rate of reaction increases as the temperature is raised, we prefer to operate between 350 and 450° C. for the best results as better control of the product is possible.

An inert diluent gas such as nitrogen or carbon dioxide may be used to sweep the reaction tube thus removing the nitrile from the reaction zone immediately as it is formed, thus avoiding any breakdown of the nitrile in the apparatus which would result in a product of inferior quality. With ketene, the off gas, and with acetic anhydride, the acetic acid liberated serves to accomplish this same action.

My process has several important advantages over known methods for the preparation of nitriles. It uses cheap and readily available materials. Ammonium salts are converted to the nitrile in a single step. Ammonium salts are soluble in hot nitriles and acetic anhydride and can be passed into the reaction zone as a stable sol thus avoiding any plugging of the reaction chamber. Complete conversion to the nitrile may be obtained by repassing any partially converted material. The only byproducts of the reaction are aliphatic acids and anhydrides which can be used in subsequent runs. With ketene, acetic acid is the main by-product which is readily convertible to ketene.

The vapors removed from the reaction zone may be subjected directly to fractionation thereby separating off the nitrile from anhydride and/or acid and any partially converted material, the amount of the latter depending on the speed and the efficiency with which the contacting of the amides or ammonium salts and the anhydrides is carried out. After separating off the nitrile, the residue may be introduced directly into the reaction tube, thus resulting in complete conversion of the amide or ammonium salt to the nitrile in my process.

The nitrile formed by my process, especially the dinitriles of the aliphatic dicarboxylic acids, may be hydrogenated by means of a hydrogenation catalyst such as Raney nickel at 135-145° C. and 50-200 atmospheres in the presence of a large excess of ammonia to give the corresponding diamine.

In processes in accordance with my invention, molar ratios of anhydrides to amides or ammonium salts within the range of 1-4:1 have been found to be quite satisfactory. The scope of my invention is not limited by these ranges as ratios both above and below this range have been found to be suitable for dehydrating amides with anhydrides in accordance with my invention. There is no advantage, however, in using anhydride (either ketene or the dimeric anhydrides) in a molar ratio of more than 4:1 to the amide or ammonium salt. In those cases where an acid anhydride is employed partially or entirely as the solvent for the material to be converted to nitrile, this may be taken into considerable in selecting the ratio of ketene or anhydride vapors which in addition will be supplied to the reaction zone.

Suitable anhydrides which may be used include ketene, methyl ketene and ethyl ketene, acetic, propionic, butyric, isobutyric and caproic anhydrides. Ketene and acetic anhydride are the preferred anhydrides for use in this process because of their availability and low cost. Ketene has a catalytic effect and less than equimolar amounts are often suitable.

In the case of ammonium salts, a greater degree of dehydration is necessary and therefore, it is conducive to more complete conversion to use a larger amount of ketone or acetic anhydride than with the amides. Instead, the contact time may be greater, but this alternative is not preferred as higher yields are obtained with a short contact time. If a limited supply of ketene is available, it is preferred to repass the material to be dehydrated rather than to use a long contact time.

The following examples illustrate my invention wherein the conversions obtained depend only on the contact time and the ratio of anhydride to amide or ammonium salt and are independent of the size and shape of the reactor and the type of inert packing used.

*Example I.*—200 parts of sebacic amide were dissolved in 500 parts of hot sebacic dinitrile. The solution was passed through a preheater having a temperature of 160° C. and into a vertical pyrex tube filled with glass rings at 400° C. Ketene was passed into the tube in a 2:1 ketene to amide molar ratio. The contact time of the ketene with the amide was 4 seconds. Distillation of the resulting product gave 620 parts of nitrile, an increase of 120 parts. The conversion of the amide to the nitrile was 73 per cent. The residue weighed 40 parts.

*Example II.*—100 parts of sebacic amide, 150 parts of sebacic dinitrile and 100 parts of acetic anhydride were heated together to form a solution. The solution was preheated and passed through a vertical tube filled with pyrex rings at 350° C. into which ketene was passed in a 4:1 molar ratio. The contact time was 3½ seconds. The yield was 226 parts of sebacic dinitrile, being a conversion of 91 per cent.

*Example III.*—156 parts of adipic amide was mixed with 300 parts of acetic anhydride. The resulting solution was introduced into the top of a vertical pyrex tube filled with glass rings which tube had a temperature of 400° C. Ketene was introduced into the tube in a 0.5:1 ratio based on amide groups. The contact time was 4.2 seconds. The product was distilled directly to yield 90 parts of adipic dinitrile, the conversion being 75 per cent. The residue resulting weighted 26 parts.

*Example IV.*—200 parts of sebacic amide were mixed with 300 parts of acetic anhydride, and the mixture was heated to form a solution. The procedure of the preceding example was repeated with the tube maintained at a temperature of 380° C. Nitrogen was also passed through the tube at the rate of 4 cu. ft. an hour. The flow of ketene was in the molar ratio of 0.75:1 based on amide groups. The contact time was 4 seconds, and the yield was 135 parts, conversion being 83 per cent.

*Example V.*—188 parts of ammonium adipate were dissolved in 240 parts of adipic dinitrile and 300 parts of acetic anhydride. The solution was passed together with ketene through a tube having a temperature of 380–400° C. The ketene flow was on the molar ratio of 2:1. Nitrogen was passed through the tube at the rate of 4 cu. ft. per hour. The material was passed through the tube 3 times with an average contact time of 6 seconds. The yield was 350 parts, conversion being 72 per cent. The residue was a brown, waxy, partially converted material weighing 20 parts.

*Example VI.*—146 parts of ammonium adipate were dissolved in 200 parts of adipic dinitrile and 300 parts of acetic anhydride. The solution was passed into a tube with ketene as described in the preceding examples. The ketene flow was 10:3 on a molar basis, and the contact time was 5 seconds. The tube was swept by a nitrogen flow at the rate of 2 cu. ft. per hour. 44 per cent conversion was obtained on a single pass. As repassing was employed, a yield of 84 per cent was obtained.

*Example VII.*—236 parts of ammonium sebacate were dissolved in 328 parts of sebacic dinitrile and 300 parts of acetic anhydride. The solution was preheated at 150° C. and then introduced into a tube supplied with ketene as described in the preceding examples. The tube had a temperature of 420° C. The ketene flow was 3:1 on a molar basis, and the contact time was 6 seconds. A nitrogen flow of 2 cu. ft. per hour swept through the tube. Conversion was 54 per cent on a single pass. Repassing gave a total conversion of 86 per cent.

*Example VIII.*—154 parts of adipic amide were dissolved in 250 parts of acetic anhydride. The mixture was preheated at 160° C. and passed through a tube filled with pyrex rings at 400° C. The contact time was 4 seconds and the tube was swept by nitrogen flowing through at the rate of 4 cu. ft. per hour. Conversion was obtained at 70.8 per cent.

*Example IX.*—280 parts of oleic amide were preheated to 180° C. and passed into a pyrex tube packed with glass rings at 420° C. Ketene was passed therein in a 1:1 molar ratio. The contact time was 4 seconds. Distillation gave 250 parts of a fraction boiling at 210–214° C. at a pressure of 15 mm. The yield was 95 per cent.

*Example X.*—250 parts of benzamide were dissolved in 300 parts of acetic anhydride. The solution was preheated at 160° C. and passed through the tube at 410° C. The ketene flow was 0.5:1 on a molar basis. The contact time was 4–5 seconds. The yield of 210 parts was obtained.

The contact times of the amides or ammonium salts and the anhydrides in my process are calculated according to the formula:

$$t = \frac{3600 \cdot 273 Vc}{22{,}400(Na+k+Nn+r) \cdot T}$$

where T is in seconds.

$Vc$ = volume of contact material in cc.

$Na+k$ = combined moles per hour of amide and/or ammonium salt and ketene or other anhydride.

$Nn+r$ = combined moles per hour of diluents such as nitrogen and nitrile.

$T$ = absolute temperature in degrees centigrade.

I claim:

1. A method of preparing nitriles of adipic and sebacic acids which comprises continuously passing through a packed pyrolysis tube in which a temperature of 350–550° C. is maintained a compound in liquid phase selected from the group consisting of the amides and the ammonium salts of adipic and sebacic acids and passing through the tube countercurrently to the liquid for a contact time of 4–6 seconds an aliphatic acid anhydride in vapor phase.

2. A method of preparing nitriles of adipic and sebacic acids which comprises continuously passing through a packed pyrolysis tube in which a temperature of 350–550° C. is maintained a compound selected from the group consisting of the amides and the ammonium salts of adipic and sebacic acids in solution in the corresponding nitrile and passing through the tube countercurrently to the liquid for a contact time of 4–6 seconds an aliphatic acid anhydride in vapor phase.

HUGH J. HAGEMEYER, JR.

REFERENCES CITED

The following references are of record in the file of this patent:

UNITED STATES PATENTS

| Number | Name | Date |
|---|---|---|
| 1,984,415 | Macallum | Dec. 18, 1934 |
| 2,121,551 | Rigby | June 21, 1938 |
| 2,200,734 | Arnold et al. | May 14, 1940 |
| 2,229,219 | Oxley et al. | Jan. 21, 1941 |
| 2,288,687 | Dreyfus | July 7, 1942 |

FOREIGN PATENTS

| Number | Country | Date |
|---|---|---|
| 530,269 | Great Britain | Dec. 9, 1940 |